United States Patent [19]

Waterman

[11] Patent Number: 4,731,428
[45] Date of Patent: Mar. 15, 1988

[54] EPOXIDIZED ISOCYANATES AND PROCESS FOR THEIR PREPARATION

[75] Inventor: Paul S. Waterman, Shelton, Conn.

[73] Assignee: American Cyanamid Co., Stamford, Conn.

[21] Appl. No.: 926,051

[22] Filed: Nov. 3, 1986

[51] Int. Cl.$^4$ .............................................. C08G 18/71
[52] U.S. Cl. ....................................... 528/69; 528/73; 528/367
[58] Field of Search ............................ 528/69, 73, 367

[56] References Cited

U.S. PATENT DOCUMENTS

| | | | |
|---|---|---|---|
| 3,407,175 | 10/1968 | Presley et al. | 528/73 X |
| 3,984,376 | 10/1976 | Yokono et al. | 528/73 X |
| 4,163,096 | 7/1979 | Seiz et al. | 528/69 |
| 4,323,658 | 4/1982 | Speranza et al. | 528/73 X |
| 4,373,083 | 2/1983 | Seiner et al. | 528/69 X |
| 4,542,165 | 9/1985 | Kumata et al. | 528/73 X |
| 4,613,660 | 9/1986 | Goel et al. | 528/73 |
| 4,614,786 | 9/1986 | Goel et al. | 528/73 X |

Primary Examiner—Earl Nielsen
Attorney, Agent, or Firm—Michael J. Kelly

[57] ABSTRACT

A process is disclosed for preparation of novel epoxy-substituted aralkyl isocyanates by reaction of tertiary aralkyl olefins and an epoxidizing agent at a temperature of from −35° C. to about 50° C. The compounds are useful as intermediates to produce curing agents for polyfunctional active hydrogen-containing compounds, e.g., by reaction with polyols to produce epoxy-pendant urethanes and then with polyamines, and the like.

2 Claims, No Drawings

EPOXIDIZED ISOCYANATES AND PROCESS FOR THEIR PREPARATION

FIELD OF THE INVENTION

This invention relates to a new process for the preparation of novel epoxy substituted aralkyl isocyanates. More particularly, it relates to the preparation of meta and para(alpha, alpha-dimethyl-alpha-isocyanato)(alpha', beta'-alpha' methylethyl)benzene by the reaction of a tertiary aralkyl olefin, mono-substituted on the side chain by an isocyanate groups with an epoxidizing agent in the presence of an organic solvent. These novel isocyanates are useful as crosslinking agents to manufacture light stable products. Because of their dual functionality one is able to select either end for reaction. They are more stable than conventional bisphenol epoxies.

BACKGROUND OF THE INVENTION

It is known that isocyanates can undergo various addition reactions with epoxidizing agents. For example, Okazaki and Simamura, *Bul Chem Soc Japan*, 47(8), 1981 (1974) add peroxy acids, such as peroxybenzoic acid to aliphatic and aralkyl isocyanates to produce aryl carbamoyl peroxides.

In view of this, if a meta or para monoolefinic aralkyl urethane was to be treated with an epoxidizing agent, it would be expected that the corresponding monoolefinic peroxycarbamate would be obtained.

It has now been unexpectedly discovered that the products obtained are epoxidized aralkyl isocyanates, in which the olefinic group is converted and the isocyanate groups are unaffected. The novel process produces useful and novel epoxidized isocyanates and both process and products are the subject of this invention.

SUMMARY OF THE INVENTION

In accordance with the present invention there is provided a process for preparation of a compound selected from those of the formulae:

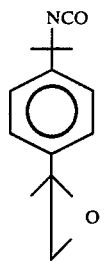
(I)

or

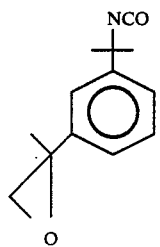
(II)

or a mixture of any of (I) and (II), said process comprising reacting (a) a tertiary aralkyl isocyanate of the formulae:

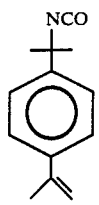
(III)

or

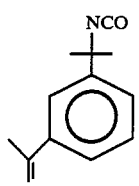
(IV)

or a mixture of any of (III) and (IV), with (b) an effective amount of an epoxidizing agent of the general formula

ROOH wherein R is selected from

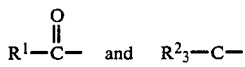

wherein $R^1$ and $R^2$ are independently selected from alkyl and halo-substituted alkyl of 1 to 30, preferably 1 to 12 carbon atoms and aryl and halo substituted arylalkaryl, halo-substituted alkaryl, aralkyl and halo-substituted aralkyl of from 6 to 30, preferably 6 to 12, carbon atoms; in (c) an inert organic solvent at a temperature of from about $-35°$ C. to about $50°$ C. until formation of (I) or (II) or a mixture of (I) and (II) is substantially complete.

Also contemplated by the present invention are compounds selected from those of the formulae:

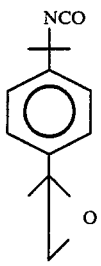
(I)

or

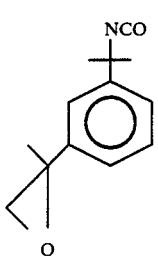
(II)

or a mixture of (I) and (II).

Additional features of the invention comprise curable compositions comprising:

(a) a compound having at least two active hydrogen-containing functional groups; and (b) an effective amount of an epoxy-pendant polyurethane curing agent for (a) which comprises a reaction product of:

(i) a polyol; and (ii) an epoxidized isocyanate.

Special mention is made of such curable compositions wherein (a) comprises a polyalkylene polyamine.

Such compositions, when cured, possess the desirable attributes of both polyurethanes and polyepoxides.

DETAILED DESCRIPTION OF THE INVENTION

The tertiary aralkyl isocyanates, useful as reactants in this invention can be prepared in a number of ways: tertiary benzyl olefins can be reacted with carbamoyl halide and then with isocyanic acid, as described by Alexanian et al., U.S. Pat. No. 4,379,767.

The epoxidizing agents useful as starting materials in accordance with the present invention include compounds of the general formula

ROOH wherein R is selected from

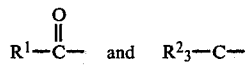

$R^1$ and $R^2$, independently, being alkyl or halo-substituted alkyl of from 1 to 30, preferably 1 to 12 carbon atoms, straight chain or branched, such as methyl, ethyl, propyl, hexyl, 2-ethyl hexyl, dodecyl, triacontyl, 2-chloro ethyl, 2-bromoethyl, and the like, or aryl or halo-substituted aryl, such as phenyl, p-chlorophenyl, naphthyl, alpha-chlorobeta-naphthyl-, alkaryl or halo-substituted alkaryl, such as p-methylphenyl, o-chloropmethyl phenyl, benzyl, p-chlorobenzyl, and the like. Especially preferred are perbenzoic acid, t-butyl hydroperoxide and meta-chloroperbenzoic acid.

The organic solvents useful for dissolving the aforementioned reactants and carrying out the desired reaction can vary broadly. Illustrative are halogenated hydrocarbons and aromatic hydrocarbons, such as methylene dichloride, toluene, xylene and chlorobenzene and the like. Especially preferred is methylene dichloride.

The reactants may be dissolved together in the organic solvent or dissolved in separate solutions containing the solvent. Generally, the tertiary aralkyl isocyanate and the epoxidizing agent are added in equal 1:1 ratios to the same or to separate solutions of solvent. If separate solutions, the dissolved reactants can be mixed together to form a reaction solution.

Initially, the temperature of the solvent with the dissolved tertiary aralky isocyanate, or epoxidizing agent, or both, should be held at a range of from $-10°$ C. to about $+10°$ C.

The product formed by this reaction can be recovered by conventional two-phase extraction procedures and removing the organic solvent. Further purification of the product can be made by any conventional method including vacuum distillation.

In one convenient manner of proceeding, a solution of about 10 parts by weight of a peroxy acid or peroxy alcohol in a solvent, such as methylene chloride is slowly added at $-15°$ C. to $0°$ C., preferably $-10°$ C. to a solution of 10 parts by weight of meta- or para-isopropenyl-alpha, alphadimethylbenzyl isocyanate (TMI) in 100 parts by weight of methylene chloride, also at $-15°$ C. to $0°$ C. After from about 5 minutes to about 30 minutes, the reaction mixture is warmed from about $20°$ C. to about $30°$ C. and stirred in this temperature range for from about 30 minutes to about 2 hours. To recover the product, the mixture is washed with a reagent to decompose peroxide, e.g., a 10% aquous sodium sulfite solution. The end point can be measured, e.g., by looking for a negative starch/iodine test. The organic layer can then be neutralized, e.g., with sodium bicarbonate solution, washed with water, and dried with anhydrous drying agent, e.g., magnesium sulfate. Evaporation of the solvent leaves the product as a residue, and it can be purified, e.g., by vacuum distillation, if desired.

Detailed exemplification of these procedures will be given hereinafter.

The products produced by this invention can be used to form coatings, intermediates for films and molding resins by reacting them, for example, with polyols, such as butanediol, trimethylol propane, glycerol, and the like, with polyester polyols, such as Multron ® 221-75 (Mobay Chemicals), polyether polyols, such as poly(-propylene glycol), and the like. The polyurethanes thus formed can be reacted through their pendant epoxide groups, with polyamines, such as diethylene triamine, or polyamides, such as the Versimides ® of General Mills, in accordance with techniques well known to those skilled in this art and to be exemplified hereinafter. In comparison with decorative and protective coatings and castings, etc., in the present state of the art, the end products have both urethane and epoxy backbones and thus should provide products with excellent light and thermal stability and strength.

DESCRIPTION OF THE PREFERRED EMBODIMENTS

The following examples illustrate the processes and compounds of the present invention. These examples are not to be construed to limit the claims in any manner whatsoever.

EXAMPLE 1

A solution containing 10 parts of m-chloroperbenzoic acid dissolved in 100 parts of methylene chloride was slowly added to a solution containing 10 parts of m-isopropenyl alpha, alpha-dimethylbenzyl isocyanate (m-TMI) dissolved in 100 parts of methylene chloride at $-10°$ C. After 10 minutes the solution was warmed to $25°$ C. and stirred at this temperature for an additional 45 minutes. The solution was then washed with a 10% sodium sulfite solution until it gave a negative starch/iodine test. The organic layer was then neutralized with a sodium bicarbonate solution, washed with water and finally dried over magnesium sulfate. Removal of the solvent yielded 11 parts of an oil which was identified as the desired product:

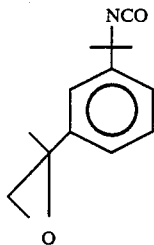

This oil was further purified by vacuum distillation at 104°–110° C. at 1.4 mm Hg affording a colorless oil in 85% yield.

EXAMPLE 2

The procedure of Example 1 was followed except that p-TMI was used in place of m-TMI. The corresponding parapendant epoxide was obtained.

EXAMPLE 3

The procedure of Example 1 was followed except that perbenzoic acid was used in place of m-chloroperbenzoic acid.

EXAMPLE 4

The procedure of Example 2 was followed except that perbenzoic acid was used instead of m-chloroperbenzoic acid.

EXAMPLE 5

The procedure of Example 1 was followed with the exception that t-butyl hydroperoxide was used in place of m-chloroperbenzoic acid.

EXAMPLE 6

A curable composition is produced from the compound of Example 1.

(a) Meta-Pendant Epoxidized Urethane - The isocyanate and trimethylol propane are mixed in a hydrocarbon solvent at 50% non-volatiles and an —NCO/—OH ratio of 1.1:1 in the presence of 1% by weight of dibutyl tin dilaurate to produce a solvent solution of a urethane having epoxidized side chains.

(b) Reaction Product with Polyamine - The solvent solution from step (a) is mixed with diethylenetriamine in an amount sufficient to react with all of the epoxy groups and the mixture is poured into a casting mold, the solvent is evaporated, and the resin mixtue is heated at 60° C. until a solid casting is obtained. The product possesses the desirable attributes of a polyurethane in combination with a polyepoxide.

The above patents and publications are incorporated by reference.

Many variations will suggest themselves to those skilled in the art in light of the above, detailed description. For example, in place of methylene dichloride, other organic solvents such as toluene, xylene and chlorobenzene can be used to carry out the reactions described herein.

All such obvious variations are within the full intended scope of the appended claims.

I claim:

1. A curable composition comprising:
   (a) a compound having at least two active hydrogen-containing functional groups; and
   (b) an effective amount of an epoxy-pendant polyurethane curing agent for (a) which comprises a reaction product of:
   (i) a polyol; and
   (ii) an epoxidized isocyanate selected from those of the formulae:

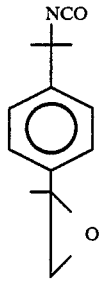 (I)

or

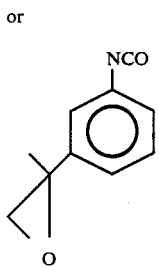 (II)

or a mixture of (I) and (II).

2. A curable composition as defined in claim 1 wherein component (a) is a polyalkylene polyamine.

* * * * *

UNITED STATES PATENT OFFICE
CERTIFICATE OF CORRECTION

Patent No. 4,731,428                    Dated   March 15, 1988

Inventor(s)  Paul S. Waterman

It is certified that error appears in the above-identified patent and that said Letters Patent are hereby corrected as shown below:

In the Claims:

Column 6, Claim 1, the second figure which is approximately between lines 38 - 46 should read as follows:

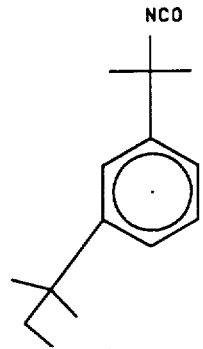

Signed and Sealed this

Twenty-seventh Day of September, 1988

*Attest:*

DONALD J. QUIGG

*Attesting Officer*          *Commissioner of Patents and Trademarks*